Nov. 22, 1960 — C. G. GORDON — 2,961,002
ELECTRO-HYDRAULIC SERVO VALVE
Filed Sept. 29, 1958 — 4 Sheets-Sheet 1
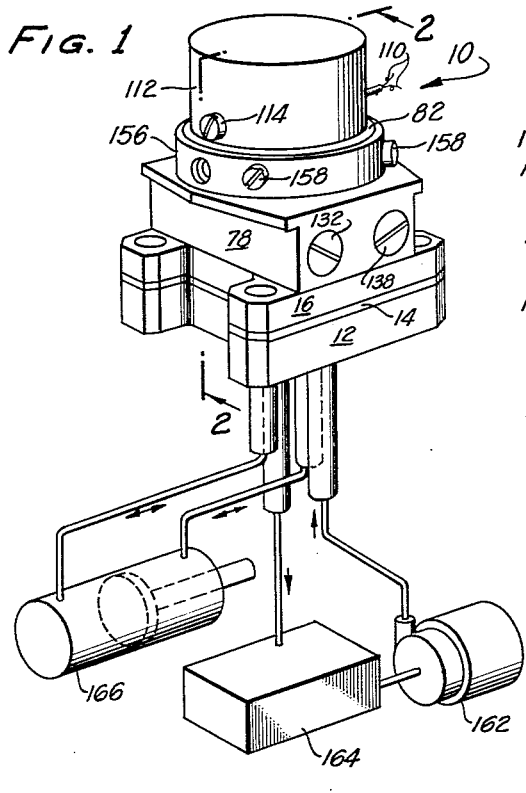
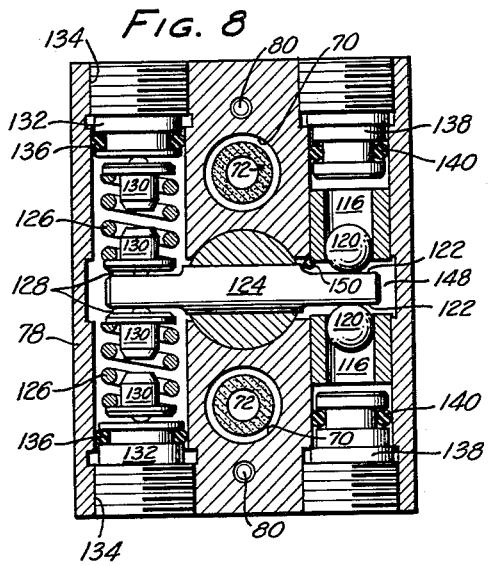
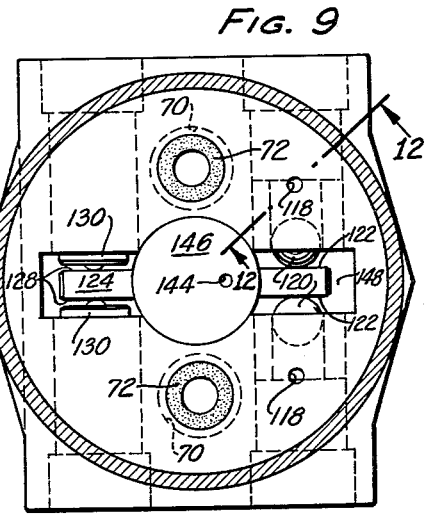
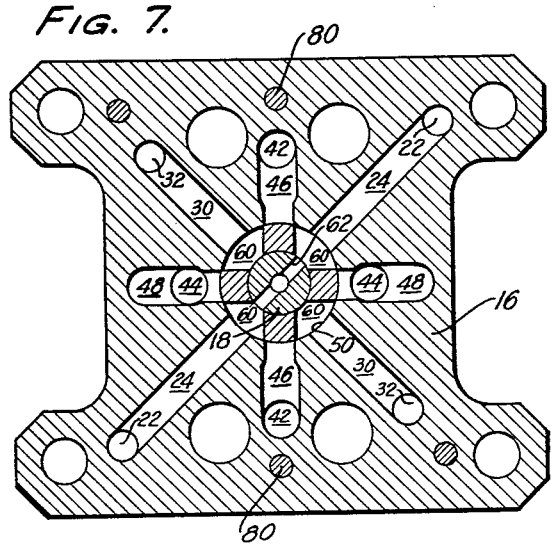
CARROLL G. GORDON
INVENTOR.
BY
ATTORNEY Nov. 22, 1960    C. G. GORDON    2,961,002
ELECTRO-HYDRAULIC SERVO VALVE
Filed Sept. 29, 1958    4 Sheets-Sheet 2

CARROLL G. GORDON
INVENTOR.

BY
ATTORNEY

Nov. 22, 1960 C. G. GORDON 2,961,002
ELECTRO-HYDRAULIC SERVO VALVE
Filed Sept. 29, 1958 4 Sheets-Sheet 3
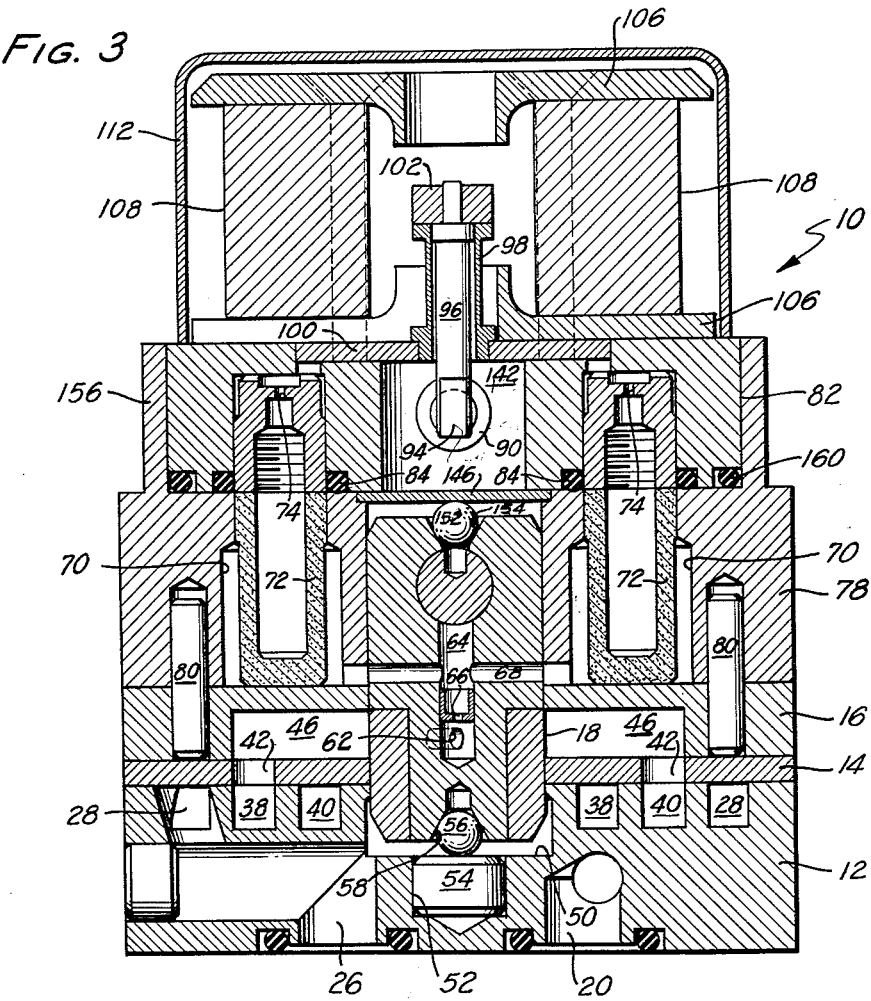
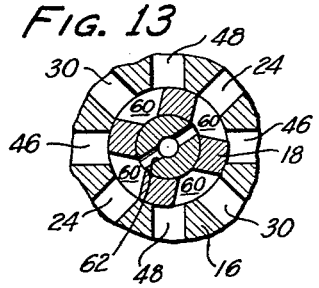
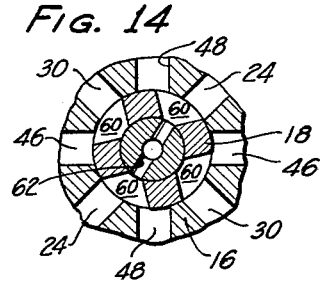
CARROLL G. GORDON
INVENTOR.
BY
ATTORNEY Nov. 22, 1960   C. G. GORDON   2,961,002
ELECTRO-HYDRAULIC SERVO VALVE
Filed Sept. 29, 1958   4 Sheets-Sheet 4
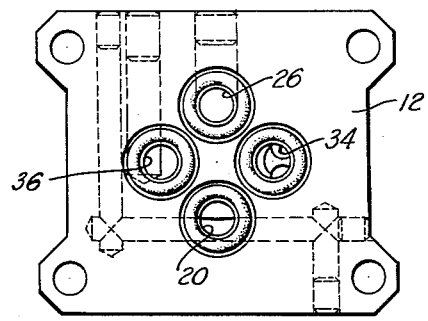
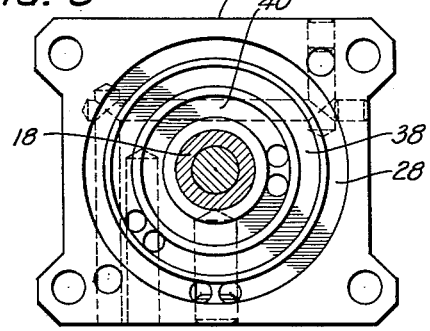
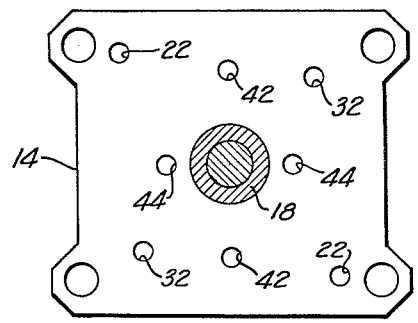
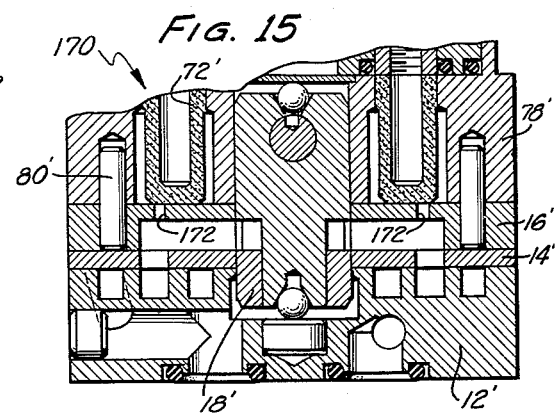
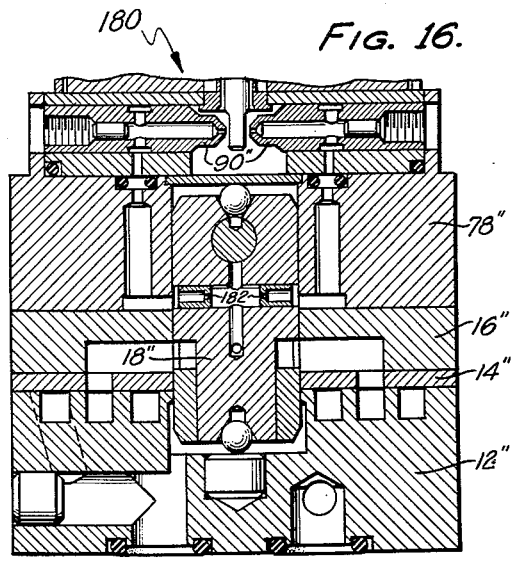
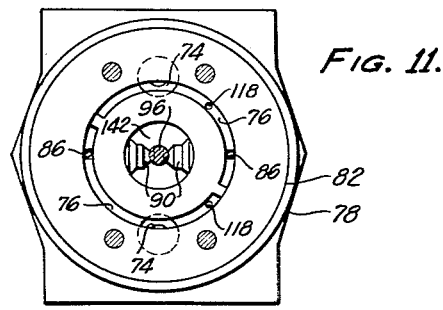
CARROLL G. GORDON
INVENTOR.
BY
ATTORNEY

United States Patent Office 2,961,002
Patented Nov. 22, 1960

2,961,002
ELECTRO-HYDRAULIC SERVO VALVE
Carroll G. Gordon, #3 Williams Court,
Menlo Park, Calif.
Filed Sept. 29, 1958, Ser. No. 766,168
12 Claims. (Cl. 137—623)

This invention pertains to new and improved valves, and more specifically to new and improved electro-hydraulic servo valves.

Electro hydraulic servo valves are commonly employed in missiles, aircraft and in a large number of industrial applications in order to control the flow of hydraulic fluid in respect to an electrical signal or input. In other words, such valves are used where it is desired to control a hydraulic mechanism in response to an electrical signal.

A large number of different types of valves have of course been designed in the past and a number of different types of electro hydraulic servo valves are known. However, it can be stated, in general terms, that the presently available valves for use in high pressure hydraulic systems tend to be unsatisfactory for any one of a variety of reasons. Frequently such valves are not satisfactory because of the fact that they do not perform satisfactorily at very high hydraulic pressures. This frequently is the result of these valves being formed so that they are capable of being bent by hydraulic fluids at such pressures or the result of these valves being built so that a certain twisting or similar movement of one or more parts of the valves takes place at such pressures causing the valves to "bind" so that they cannot be satisfactorily employed.

Hydraulic valves which are also temperature sensitive in that they cannot be operated with high temperature hydraulic fluids due to expansion of one or more parts of such valves, or due to seal failure or the like are also disadvantageous for present day applications. In such applications weight is frequently a problem which tends to limit the use of many present day valve structures.

An object of the present invention is to provide a new and improved valve; another general object of the invention is to provide new and improved electro hydraulic servo valves. A further object of the present invention is to provide both valves and electro hydraulic servo valves which are comparatively light in weight, which can be operated satisfactorily with hydraulic fluids at extreme pressures and at elevated temperatures. A further object of this invention is to provide structures of the type described which may be easily constructed with a minimum of number of parts and seals at comparatively nominal cost and which are very dependable in operation.

These and other objects of this invention will be fully apparent to those skilled in the art to which this invention pertains from a detailed consideration of the remainder of this description including the appended claims and the accompanying drawings in which:

Fig. 1 is a perspective view of an electro hydraulic servo valve of the invention showing the use of such a valve;

Fig. 3 is a cross-sectional view taken at line 3—3 of Fig. 2;

Fig. 4 is a cross-sectional view taken at line 4—4 of Fig. 2;

Fig. 5 is a cross sectional view taken at line 5—5 of Fig. 2;

Fig. 6 is a cross sectional view taken at line 6—6 of Fig. 2;

Fig. 7 is a cross-sectional view taken at line 7—7 of Fig. 2;

Fig. 8 is a cross sectional view taken at line 8—8 of Fig. 2;

Fig. 9 is a cross-sectional view taken at line 9—9 of Fig. 2;

Fig. 11 is a cross-sectional view taken at line 11—11 of Fig. 2;

Figs. 13 and 14 are partial cross-sectional views corresponding to Fig. 7 indicating the use of a valve as herein described; and Figs. 15 and 16 are cross-sectional views corresponding to Fig. 3 of modified electro hydraulic servo valves of this invention.

Figure 2:
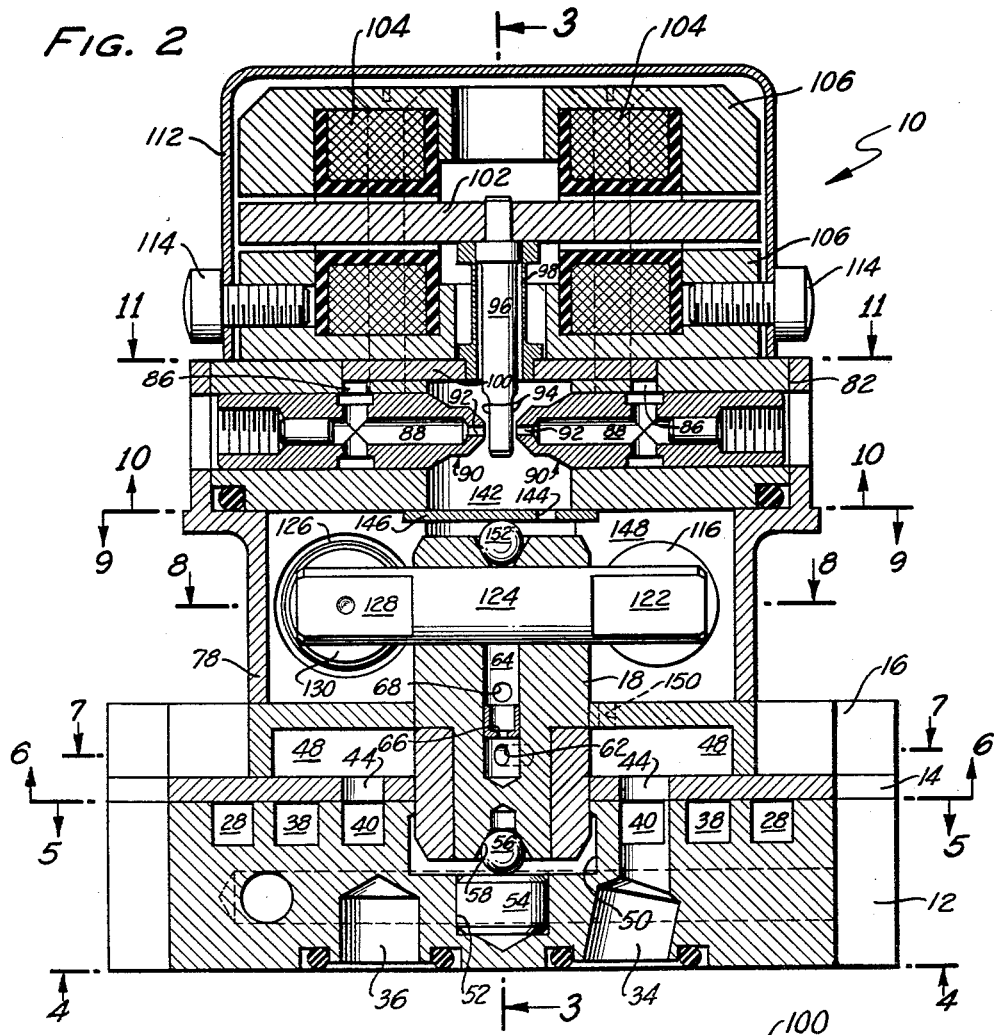
Fig. 2 is a cross-sectional view of the valve shown in Fig. 1 taken at line 2—2 of Fig. 1.

In all figures of the drawing like numerals are used to designate like parts wherever convenient for purposes of illustration and explanation. The accompanying drawings are primarily intended so as to clearly illustrate presently preferred embodiments or forms of this invention. Those skilled in the art to which this invention pertains will realize however that various sizes, shapes, etc., of the various parts of the electro hydraulic servo valves shown may be changed or altered in accordance with normal engineering practices without changing the manner in which the valves shown operate.

As an aid to understanding the invention it may be stated in essentially summary form that it involves valves, each of which is formed so as to include a valve body having a cavity located therein. Such valve body is provided with passages and openings so that the forces exerted by hydraulic fluid flowing with respect to this valve are equalized and balanced at all times around the interior of this cavity. Further, with such a valve a valve rotor of a balanced nature is rotatably mounted in the cavity so that as the rotor is turned various openings and passages within the valve body itself can be placed in communication with one another. A valve or "valve means" of this category is used in electro hydraulic servo valves of this invention together with what are termed "valve actuator means," "hydraulic amplifier means" and "electric control means." All of these four means are connected together as hereinafter explained so that when an electric signal is supplied to the electric control means the hydraulic amplifier means is affected so as to, in turn, cause the valve actuator means to operate so as to affect the position of the valve means employed.

The actual nature of this invention is best more fully explained by referring directly to the accompanying drawing where there is shown an electro hydraulic servo valve 10 of the present invention. The portions of this complete servo valve 10 comprising a lower valve body 12, a manifold plate 14 and a valve plate 16 are secured to what may be considered a valve body from which there projects a valve rotor 18 which is adapted to be turned as hereinafter explained so as to achieve a valve action. The valve rotor 18 thus cooperates with the valve body 12, the manifold plate 14 and the valve plate 16 so as to define what may be considered a valve or a "valve means" alone.

With this structure an inlet passage 20 (Fig. 3) leads through an opening 22 in the manifold plate 14 (Fig. 6) into the ends of aligned pressure passages 24 (Fig. 7) formed in the valve plates 16. A return passage 26 (Fig. 3) leads to a circular groove 28 (Fig. 5) in the side of the valve body 12 adjacent to the manifold plate 14. This groove is in communication with aligned return passages 30 (Fig. 7) in the valve plate 16 through openings 32 (Fig. 6) in the manifold plate 14. Supply passages 34 and 36 (Fig. 2) in the valve body 12 lead to other circular grooves 38 and 40 (Fig. 5) respectively, in the side of the valve body 12 adjacent to the manifold plate 14. These grooves 38 and 40 are connected through openings 42 and 44 (Fig. 6) respectively in the manifold plate to aligned supply passages 46 and 48 (Fig. 7) in the valve plate 16.

With this construction the valve body 12, the manifold plate 14 and the valve plate 16 are formed so as to define an internal cavity 50 having a surface corresponding to the shape of a surface of revolution, preferably a cylinder, as shown. In the end of the cavity 50 within the body 12 there is located a small cavity 52 (Figs. 2 and 3) which is adapted to contain a small plug 54 forced into it for positional purposes. With this construction a small ball 56 acting as a bearing is located within a small tapered depression 58 in the valve rotor 18 so as to serve to support in a rotatable manner one end of this valve rotor.

The valve rotor 18 has a shape which corresponds to the internal shape of the cavity 50, and fits closely against the interior of this cavity so as to normally seal the openings from the passages 24, 30, 46 and 48 when the valve rotor 18 is in the position shown in Fig. 7 of the drawing. The valve rotor 18 may be formed so as to have a series of equally spaced notches 60 located therein adjacent to the openings from the passages 24, 30, 46 and 48 into the cavity 50.

For convenience in understanding the invention these specific openings are not separately designated in the accompanying drawing, since they are merely the ends of the respective passages which are separately identified. However, these openings are all spaced equally from one another around the interior of the cavity and are all located in the same plane perpendicular to the axis of the cavity 52 and the valve rotor 18. As is shown in Fig. 7 of the drawing when the valve 10 is in a closed position the notches 60 are directly opposite the openings into the pressure passages 24 and the return passages 30. The openings to the pressure passages 24 are each located at opposite sides of the cavity; the openings to the return passages 30 and the supply passages 46 and 48 are also located in this manner. Further, the supply passages 46 and 48 are located so that the opening to each one of these passages is located between the opening to one of the pressure passages 24 and the opening to one of the return passages 30.

This type of construction is designed to provide a "balanced" valve in which the forces of the opposite sides of the axis of the rotor 18 and of the cavity 52 are equal at all times. With this construction this balanced nature is maintained even when the rotor 18 is turned a slight amount as indicated in Figs. 13 and 14 of the drawing in either a clockwise or counterclockwise direction so as to place the pressure passages 24 in communication with the supply passages 46, and the return passages 30 in connection with the supply passages 48 or so as to place the pressure passages 24 in communication with the supply passages 48 and the return passages 30 in communication with the supply passage 46. It will be realized that when the valve rotor 18 is rotated in this manner that the valve is, of course, opened.

With the structure shown hydraulic fluid under pressure is conveyed from the pressure passages 24 into a cross bore 62 (Fig. 3) in the valve rotor 18 and then through an axial bore 64 past a small pressure reducing orifice 66 to another crossbore 68 (Fig. 3) which serves to divide this stream of fluid into two equal streams. These streams of fluid under equal pressure are each conveyed into a filter cavity 70 (Fig. 3) and thence through very fine filter elements 72 in these cavities past other pressure reducing orifices 74 into the grooves 76 (Fig. 11).

The filter cavities 70 and the filter elements 72 are located in an upper valve body 78 which is attached to the valve plate 16. If desired pins 80 (Fig. 3) may be used in aiding in aligning the valve body 78 and the valve plate 16 with respect to one another during assembly. The orifices 74 and the grooves 76 are located in a hydraulic amplifier body 82 mounted directly upon the upper valve body 78. If desired small O-ring seals 84 or the equivalent may be used in preventing fluid leakage between the valve body 78 and the hydraulic amplifier body 82.

Holes 86 in the hydraulic amplifier body 82 lead from the groove 76 to passages 88 in nozzles 90 (Fig. 2) having identical nozzle orifices 92. With this construction the two equal streams of hydraulic fluid conveyed from the valve rotor 18 pass through an identical series of structures so that the pressure of the two streams of fluid emitted from the nozzle orifices 92 are normally equal.

These two streams from the nozzle orifices 92 are designed to impinge upon flat sides 94 (Fig. 2) of a small flapper 96, an end of which remote from the nozzles 90 is sealed with respect to a small, flexible tube 98. With this structure the flapper 96 may move slightly between the nozzle orifices 92. The end of the tube 98 adjacent to the nozzles 90 is sealed to a small sealing plate 100 which in turn is attached to the hydraulic amplifier body 82 so as to cover and seal the grooves 76 in this hydraulic body 82.

The end of the flapper 96 remote from the nozzle 90 is rigidly secured to the center of a movable armature 102 projecting through electrical coils 104 (Fig. 2) mounted between pole pieces 106 of soft iron or the equivalent. These pole pieces 106 of soft iron also carry bar magnets 108 (Fig. 3) which cooperate with the pole pieces 106 to provide a magnetic bias and provide higher armature forces when a current is applied to the coils 104 through appropriate wires 110 (Fig. 1). One of the pole pieces 106 may be conveniently attached to the hydraulic amplifier body 82.

The assembly consisting of the flapper 96, the armature 102, the coils 104, the pole pieces 106 and the bar magnets 108 can be considered electric control means because of the manner in which these are used in controlling the operation of the complete electro hydraulic servo valve 10 as hereinafter described. If desired this entire assembly constituting an electrical control means may be covered by means of a protective cap 112 (Fig. 2) attached to one of the pole pieces 106 by means of screws 114.

Figure 10:
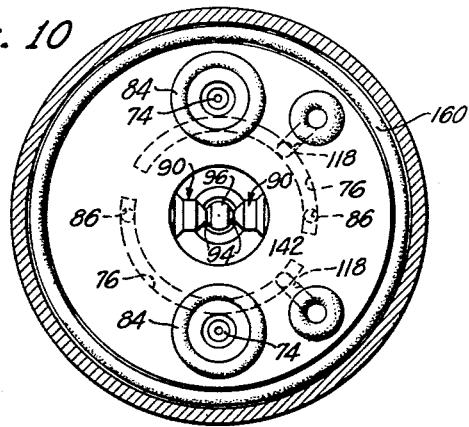
Fig. 10 is a cross-sectional view taken at line 10—10 of Fig. 2.
Figure 12:
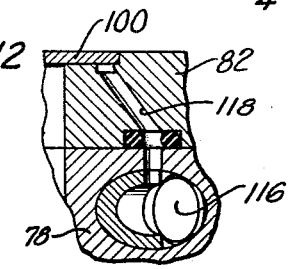
Fig. 12 is a cross-sectional view taken at line 12—12 of Fig. 9.

Further, with the construction shown the nozzles 90 and the connected passages, grooves, etc., in the hydraulic amplifier body 82 as well as the end of the flapper 96 containing the flat sides 94 located between the nozzle orifices 92 constitute a hydraulic amplifier or hydraulic amplifying means which is connected to a portion of the complete servo valve 10 serving as a valve actuator means. Such a valve actuator means in the complete valve 10 includes aligned cylinders 116 (Fig. 8) which are connected to the grooves 76 by means of other holes 118 (Fig. 10). The ends of the cylinders 116 are normally closed by small balls 120 serving as pistons when hydraulic fluid is conveyed to the cylinders 116 under pressure through the holes 118. The normal pressure of such fluid during the operation of the complete servo valve 10 is sufficient so that the balls 120 are held against flat sides 122 of an arm 124 extending through the axis of the valve rotor 18. It will be seen from this description that this motion of the balls 120 is transmitted through the arm 124 so as to cause rotation of the valve rotor 18 as indicated in either Figs. 13 or 14 of the drawings and as previously described.

The normal position of the arm 124 corresponding to a closed position of the rotor 18 is normally maintained by springs 126 (Fig. 8) bearing against flat sides 128 of the arm 124 on the end thereof remote from the flat sides 122. In order to aid in holding the springs 126 in position small spring retainers 130 may be located in the ends of them. The tension upon the springs 126 may be adjusted as required through the rotation of the threaded plugs 132 within threaded openings 134 in the upper valve body 78. Conventional O-ring seals 136 are preferably located adjacent to these plugs 132 for the obvious purpose. For ease in manufacture and assembly similar plugs and seals 138 and 140 respectively, may be located at the ends of the cylinders 116.

With the complete electro hydraulic servo valve 10 fluid from the nozzle orifices 92 is conveyed from the cavity 142 (Figs. 2 and 3) in the hydraulic amplifier body 82 containing the flapper 96 through a small opening 144 (Fig. 2) in a mounting plate 146 into the cavity 148 (Fig. 8) containing the arm 124. From the cavity such fluid and any fluid from the cylinders 116 flows back to the return passage 30 through a small opening 150 (Fig. 2) in the valve plate 16.

A small ball 152 corresponding to the ball 56 previously described is located between the mounting plate 146 and a tapered depression 154 corresponding to the tapered depression 58 previously described in the valve rotor 18 in order to complete the mounting of this valve rotor.

In assembly the complete electro hydraulic servo valve 10, the lower valve body 12, the manifold plate 14 and the valve plate 16 and the upper valve body 78 may all be secured together in any convenient manner. With the preferred construction of this invention these parts are formed of an appropriate steel capable of being bonded by furnace brazing so as to provide a complete unit. The hydraulic amplifier body 82 may be conveniently secured in place as shown with respect to a flange 156 (Fig. 3) on which the upper valve body 78 by means of screws 158 (Fig. 1) using a conventional type of O-ring seal 160 (Fig. 3) in order to prevent leakage of hydraulic fluid. This method of construction provides a very simple structure which is comparatively light in weight and which contains a minimum of seals capable of giving trouble under various usage conditions.

During the operation of the electro hydraulic servo valve 10 the inlet passage 20 and the pressure passage 24 are connected to a hydraulic pump 162 and a reservoir 164 as shown in Fig. 1 of the drawing so that fluid flows from the pump 162 to the inlet passage 20 so that it returns to the reservoir 164 through the return passage 26 during the operation of this valve 10.

As hydraulic fluid moves in this manner some of the hydraulic fluid under pressure is divided into several streams at equal pressures by the cross bore 68 in the valve rotor 18. The pressure within these two streams of fluid is further reduced as they pass through the filter elements 72 and the orifices 74; there fluid from each of these streams is emitted against the flat sides 94 of the flapper 96. As long as this flapper 96 is in the "middle" or neutral position shown in Fig. 2 of the drawing the pressures from these two streams of fluid conveyed to the cylinders 116 are equal so that the arm 124 is not caused to rotate. When, however, an electric signal is fed to the coils 104 the armature 102 is moved causing movement of the flapper 96 toward either one or the other of the nozzle orifices 92. This, in turn causes a pressure differential between the two streams of hydraulic fluid previously described, and this pressure differential in turn causes the positions of the balls 120 in the cylinders 116 to change. As this occurs the arm 124 is rotated so as to turn the valve rotor 18 in either a clockwise or counterclockwise direction depending upon the manner in which the coils 104 are actuated. When this is done one of the supply passages 34 and 36 serves to convey hydraulic fluid from the complete valve 10 to an appropriate servo mechanism 166 which in the drawing takes the form of a simple hydraulic cylinder. Obviously fluid travels through one of the supply passages 36 to this mechanism 166 and returns through the other of the supply passage and thence through the return passage 26 to the hydraulic reservoir 164.

It is possible to modify the electro hydraulic servo valve 10 in a number of different manners. In Fig. 15 of the drawing there is shown a portion of a modified electro hydraulic servo valve 170 of the present invention which is substantially identical to the complete valve 10 previously described. For convenience these parts of this valve which are the same as parts of the preceding valve 10 are designated by the primes of the numerals previously used and are not separately identified in this description. With this valve 170 the passages 46' are connected directly to the filter cavity 70' by means of small openings 172 in the valve plate 16'. With the particular construction shown it is intended that the supply passage 34' be used as an inlet passage and that the supply passage 36' be used as a return passage, and in a similar manner that the inlet passage 20' and that the pressure passage 24' be used as supply passages. Thus, it will be understood from this description of the use of the valve 70 that it is substantially immaterial in what manner the various passage in the valve body 12 are connected so long as they are connected as previously described in a balanced manner so that each service or supply opening into the rotor cavity 50' is located immediately adjacent to what is then being used as a pressure or inlet opening and a return opening.

In Fig. 16 of the drawing there is shown a further modified electro hydraulic servo valve 180 of the present invention which is substantially identical to the electro hydraulic servo valve 10. For convenience the parts of this valve 180 which are the same as the parts of the valve 10 are designated by the double primes of the numerals previously employed. This valve 180 differs from the valve 10 in that the pressure reducing orifice 66 described in connection with the valve 10 is removed from the axial bore 64" and instead of it two identical pressure reducing orifices 182 are located on opposite sides of the other cross bore 68". Also with the valve 180 the filter elements 72 are omitted.

Because of the nature of this invention, and the fact that valves or electro-hydraulic servo valves as herein described can be modified in many ways, this invention is to be considered as being limited only by the appended claims forming a part of this disclosure.

I claim:

1. An electro hydraulic servo valve which includes: valve means including an inlet passage, an outlet passage and supply passages, and a rotor adapted to be rotated so as to place certain of said passages in communication with other of said passages; valve actuator means, said valve actuator means including a movable member connected to said rotor and means for moving said movable member; hydraulic amplifier means, said hydraulic amplifier means including passage means connected to said inlet passage and other passage means connected to said means for moving said movable member, said hydraulic amplifier means also including a movable control member; and electric control means connected to said movable control member whereby when said electric control means is actuated said movable control means is moved so as to operate said hydraulic amplifier means, causing fluid from said inlet passage to be conveyed through said other passage means to said means for moving said movable member so as to cause said movable member to rotate said valve rotor in order to place certain of said passages in communication with other of said passages in said valve means.

2. An electro hydraulic servo valve as defined in claim 1 wherein said movable member comprises: a lever arm attached to said rotor so as to extend therefrom, and wherein said means for moving said movable member includes cylinder means located adjacent to said arm and piston means adapted to bear against said arm positioned within said cylinder means, and wherein said other passage means are connected to the interior of said cylinder means.

3. An electro hydraulic servo valve as defined in claim 1 wherein said passage means includes two symmetrical passages, wherein said passages lead to two symmetrical nozzles and wherein said movable control member includes a flapper, and wherein said nozzles are directed at opposite sides of said flapper, and wherein said symmetrical passages are connected to said other passage means.

4. An electro hydraulic servo valve as defined in claim 1 wherein said electric control means includes a movably mounted armature, coil means for moving said armature and wherein said armature is attached to said movable control member.

5. An electro hydraulic servo valve as defined in claim 1 wherein said valve means includes a valve body having a cylindrical cavity located therein, said rotor being rotatably mounted within said cavity and wherein said inlet passage, said outlet passage and said supply passages lead to the interior of said cavity and wherein said rotor is provided with a series of notches formed therein, said notches being adapted to serve as passages in placing certain of said passages in communication with other of said passages.

6. An electro hydraulic servo valve which includes: valve means including an inlet passage, and outlet passage and supply passages, and a movable valve body adapted to be moved so as to place certain of said passages in communication with other of said passages; valve actuator means, said valve actuator means including a lever means operatively connected to said valve body so as to extend therefrom and means for exerting pressure on said lever means remote from said valve body so as to cause movement of said body; hydraulic amplifier means, said hydraulic amplifier means including passage means connected to said inlet passage and other passage means connected to said means for moving said movable member, said hydraulic amplifier means also including a movable control member; and electric control means connected to said movable control member whereby when said electric control means is actuated said movable control means is moved so as to operate said hydraulic amplifier means, causing fluid from said inlet passage to be conveyed through said other passage means to said means for moving said movable member so as to cause said movable member to move said valve body in order to place certain of said passages in communication with other of said passages in said valve means.

7. An electro hydraulic servo valve as defined in claim 6 wherein said passage means includes two symmetrical nozzles and wherein said movable control member includes a flapper, and wherein said nozzles are directed at opposite sides of said flapper, and wherein said symmetrical passages are connected to said other passage means.

8. An electro-hydraulic servo valve as defined in claim 6 wherein said electric control means includes a movably mounted armature, coil means for moving said armature and wherein said armature is attached to said movable control member.

9. An electro-hydraulic servo valve which includes: valve means including an inlet passage, an outlet passage and supply passages, and a rotor adapted to be rotated so as to place certain of said passages in communication with other of said passages; lever means attached to said rotor so as to extend therefrom; pressure responsive means for applying force to said lever means so as to cause rotation of said rotor, said means for applying force being operatively associated with said lever means; hydraulic amplifier means for actuating said means for applying force so as to cause rotation of said rotor, said hydraulic amplifier means including passage means connected to said inlet passage and other passage means connected to said means for applying force, said hydraulic amplifier means also including a movable control member; and electric control means for causing actuation of said control member operatively connected to said control member.

10. An electro-hydraulic servo valve which includes: valve means including an inlet passage, an outlet passage and supply passages, and a rotor adapted to be rotated so as to place certain of said passages in communication with other of said passages; lever means attached to said rotor so as to extend therefrom; cylinder means located adjacent to an extremity of said lever means remote from said rotor; piston means movably mounted within said cylinder means so as to engage said lever means; hydraulic amplifier means including passage means connected to said inlet passage and other passage means connected to the interior of said cylinder means, said hydraulic amplifier means also including a movable control member capable of being actuated so as to vary the pressure within said cylinder means; and electric control means for causing movement of said movable control member operatively connected to said movable control member.

11. An electro-hydraulic servo valve which includes: valve means including inlet passage, an outlet passage and supply passages, and a rotor adapted to be rotated so as to place certain of said passages in communication with other of said passages; lever means attached to said rotor so as to extend therefrom; spring means resiliently engaging an extremity of said lever means remote from said rotor; cylinder means located adjacent to an extremity of said lever means remote from said rotor; piston means movably mounted within said cylinder means so as to engage said lever means; hydraulic amplifier means including passage means connected to said inlet passage and other passage means connected to the interior of said cylinder means, said hydraulic amplifier means also including a movable control member capable of being actuated so as to vary the pressure within said cylinder means; electric control means for causing movement of said movable control member operatively connected to said movable control member.

12. An electro-hydraulic servo valve which includes: valve means including an inlet passage, an outlet passage and supply passages, and a rotor adapted to be rotated so as to place certain of said passages in communication with other of said passages; lever means attached to said rotor, said lever means having first and second extremities located remote from said rotor; two cylinder means located adjacent said first extremity of said lever means, said cylinder means being located on opposite sides of said lever means; piston means movably located within each of said cylinder means, each of said piston means engaging said lever means; spring means engaging opposite sides of said second extremity of said lever means; hydraulic amplifier means for creating a pressure differential in the pressures in the interiors of said cylinder means including passage means connected to said inlet passage and other passage means connected to the interiors of said cylinder means, said hydraulic amplifier means also including a movable control member; and electric control means for causing movement of said movable control member connected to said movable control member, said electric control means being operative to actuate said hydraulic amplifier means so as to create a pressure differential between said cylinder means, so as to cause movement of said lever means and rotation of said rotor.

References Cited in the file of this patent

UNITED STATES PATENTS

| | | |
|---|---|---|
| 2,774,378 | Mekelburg et al. | Dec. 18, 1956 |
| 2,835,265 | Brandstadter | May 20, 1958 |
| 2,866,441 | Faurey | Dec. 30, 1958 |